(12) United States Patent
Millard et al.

(10) Patent No.: US 7,460,872 B2
(45) Date of Patent: Dec. 2, 2008

(54) METHOD AND APPLICATION FOR AUTOMATIC TRACKING OF MOBILE DEVICES FOR COMPUTER NETWORK PROCESSOR SYSTEMS

(75) Inventors: Thomas A. Millard, Cary, NC (US);
Charles J. Sannipoli, Raleigh, NC (US);
Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 10/886,289

(22) Filed: Jul. 6, 2004

(65) Prior Publication Data

US 2006/0009152 A1    Jan. 12, 2006

(51) Int. Cl.
*H04Q 7/20* (2006.01)

(52) U.S. Cl. ............... 455/456.5; 455/456.1; 455/457; 455/404.1; 455/404.2; 455/406; 701/201; 340/988; 340/995.1; 340/995.22; 707/3; 379/114.01; 379/114.03; 379/115.03; 379/125

(58) Field of Classification Search ...... 455/456.1–457, 455/414.1, 406, 404.2, 408, 422.1, 461; 340/539.13, 340/988–996, 287–309; 701/213, 216, 201, 701/208; 705/13, 35; 342/357.07, 450–465; 379/37–51, 114.01, 114.03, 115.03, 125; 707/3

See application file for complete search history.

(56) References Cited

U.S. PATENT DOCUMENTS

| | | | | |
|---|---|---|---|---|
| 5,303,297 A | * | 4/1994 | Hillis | 455/406 |
| 5,364,460 A | | 11/1994 | Morimoto et al. | 106/1.23 |
| 5,727,057 A | * | 3/1998 | Emery et al. | 379/201.07 |
| 5,758,313 A | * | 5/1998 | Shah et al. | 455/456.2 |
| 5,774,802 A | * | 6/1998 | Tell et al. | 455/408 |
| 5,848,373 A | * | 12/1998 | DeLorme et al. | 701/200 |
| 6,011,974 A | | 1/2000 | Cedervall et al. | 455/456 |
| 6,202,023 B1 | * | 3/2001 | Hancock et al. | 701/201 |
| 6,243,587 B1 | | 6/2001 | Dent et al. | 455/456 |
| 6,292,743 B1 | * | 9/2001 | Pu et al. | 701/202 |
| 6,522,875 B1 | * | 2/2003 | Dowling et al. | 455/414.3 |
| 6,553,218 B1 | * | 4/2003 | Boesjes | 455/406 |
| 6,819,258 B1 | * | 11/2004 | Brown | 340/825.49 |
| 6,862,500 B2 | * | 3/2005 | Tzamaloukas | 701/1 |
| 6,917,878 B2 | * | 7/2005 | Pechatnikov et al. | 701/210 |
| 7,010,308 B2 | * | 3/2006 | Hendrey | 455/456.5 |
| 7,136,474 B2 | * | 11/2006 | Shaffer et al. | 379/211.02 |
| 7,177,623 B2 | * | 2/2007 | Baldwin | 455/404.2 |

(Continued)

*Primary Examiner*—Sharad Rampuria
(74) *Attorney, Agent, or Firm*—Joscelyn G. Cockburn; Patrick J. Daugherty; Driggs, Hogg, Daugherty & Del Zoppo Co., LPA

(57) ABSTRACT

A method and system is provided for tracking mobile devices combining packet processing technology with Global Positioning System (GPS) technology. A central network system comprising a packet processing subsystem receives transmitted GPS location data from a mobile device transmitting GPS location data, wherein the packet processing subsystem uses a table access scheme to process the GPS location data and produce responsive mapping data, and the central network processing system compares the mapping data to a map and identifies a corresponding map location. Embodiments may also correlate device identification data, tracking table entries, and/or billing zone charges. In some embodiments a look-up key is built responsive to the GPS location data and used to identify map locations. The table access scheme may be a key hashing scheme and, in particular, a longest prefix match type scheme.

6 Claims, 5 Drawing Sheets

U.S. PATENT DOCUMENTS

| | | | |
|---|---|---|---|
| 7,246,109 B1 * | 7/2007 | Ramaswamy | 707/3 |
| 2002/0072377 A1 * | 6/2002 | Fan et al. | 455/456 |
| 2003/0093341 A1 * | 5/2003 | Millard et al. | 705/34 |
| 2004/0139062 A1 * | 7/2004 | Millard et al. | 707/3 |
| 2004/0167711 A1 * | 8/2004 | Chen et al. | 701/209 |
| 2005/0097018 A1 * | 5/2005 | Takida | 705/35 |

* cited by examiner

Figure 1. X-Y Coordinate Map with Toll Zone

METHOD AND APPLICATION FOR AUTOMATIC TRACKING OF MOBILE DEVICES FOR COMPUTER NETWORK PROCESSOR SYSTEMS

BACKGROUND OF THE INVENTION

It is known to incorporate Global Positioning System (GPS) technology within wireless devices, such as cellular phones and handheld computers. This provides desirable additional information to a user of such device, as well as provides more accurate location information for governmental emergency response to the user of such a device, for example a response to "911" emergency calls.

However, it is readily apparent that with large-scale use of such devices, real-time tracking of any given individual device can become difficult and complex. For example, a large metropolitan area could potentially contain tens of thousands of active devices during busy periods; and the future may bring may even greater numbers of devices "online". Yet, the location of any specific device must be quickly determined in an emergency. A similar scheme may be required to track a specific device or a very large number of devices for non emergency applications, such as within commercial shipping and delivery services.

What is needed is an improved method and system for advanced tracking systems for large numbers of mobile devices by combining network processor technology with GPS technology.

SUMMARY OF THE INVENTION

A method and system is provided for tracking mobile devices combining packet processing technology with Global Positioning System (GPS) technology. A central network system comprising a packet processing subsystem receives transmitted GPS location data from a mobile device transmitting GPS location data, wherein the packet processing subsystem uses a table access scheme to process the GPS location data and produce responsive mapping data, and the central network processing system compares the mapping data to a map and identifies a corresponding map location. Embodiments may also correlate device identification data, tracking table entries, and/or billing zone charges. In some embodiments, a look-up key is built responsive to the GPS location data and used to identify map locations. The table access scheme may be a key hashing scheme and, in particular, a longest prefix match type scheme.

DESCRIPTION OF THE PREFERRED EMBODIMENTS

Figure 1:
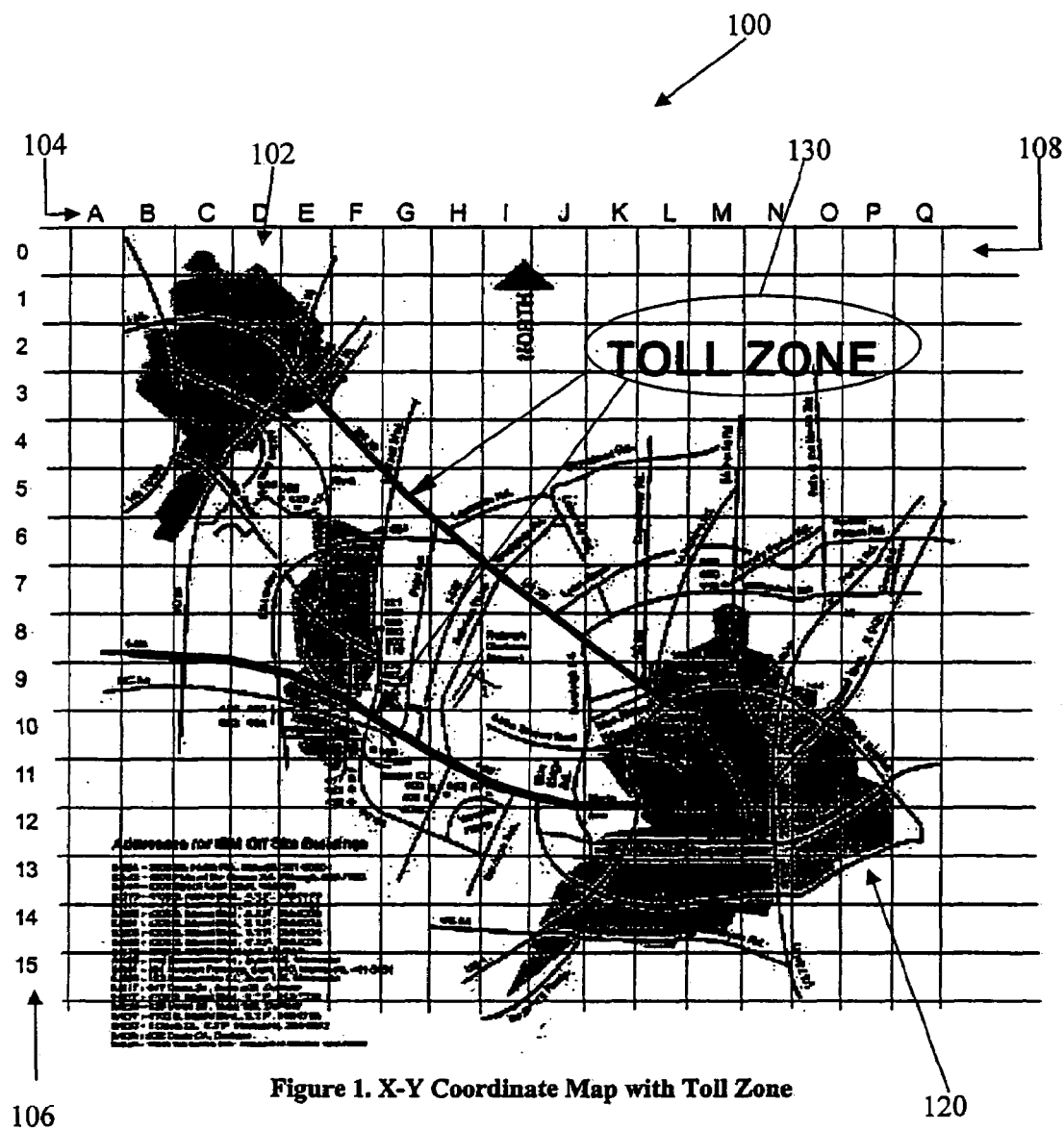
FIG. 1 is a graphical illustration of a mapping display according to the present invention.
Figure 2:
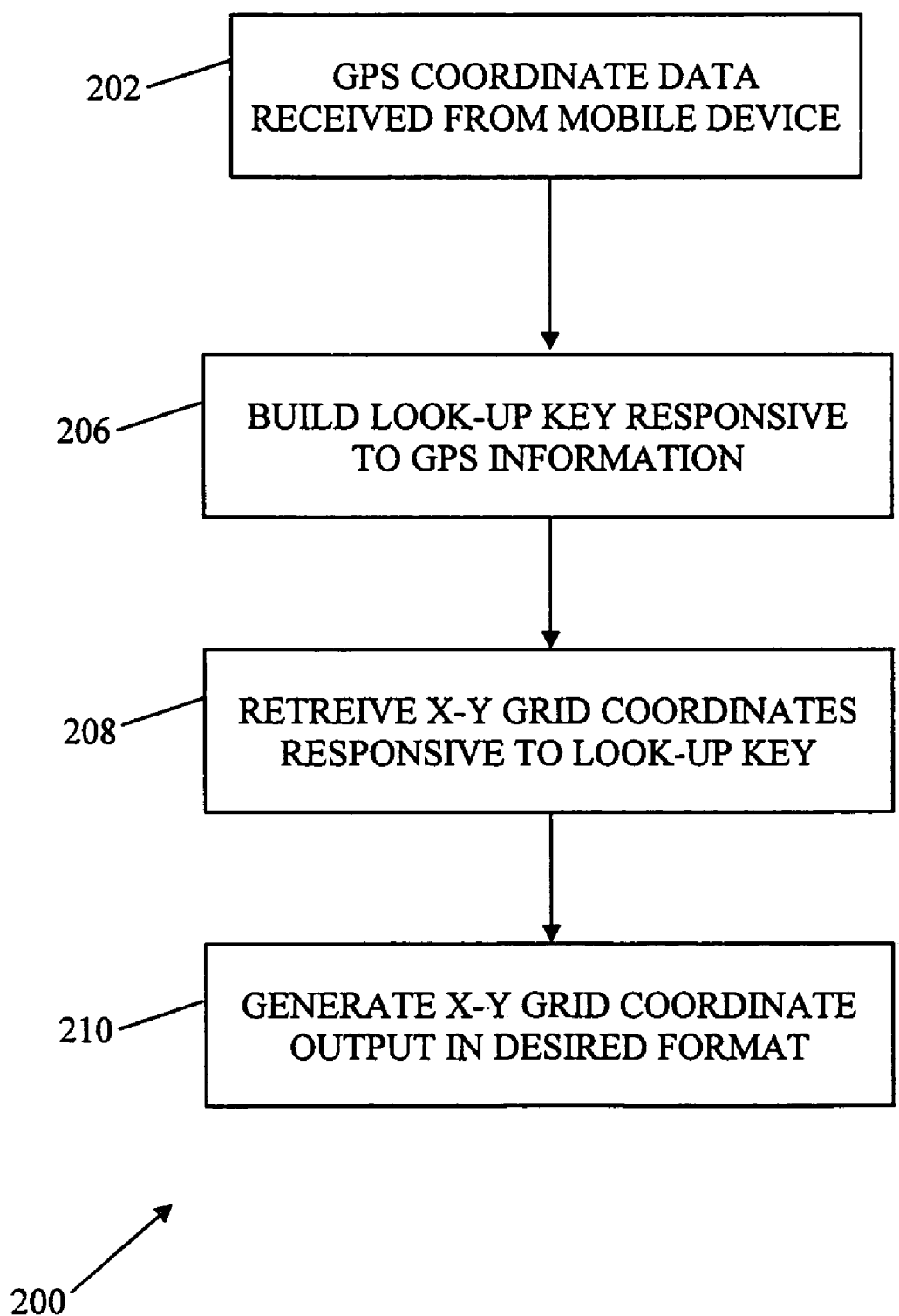
FIG. 2 is a block diagram of a method for generating the mapping display of FIG. 1.
Figure 3:
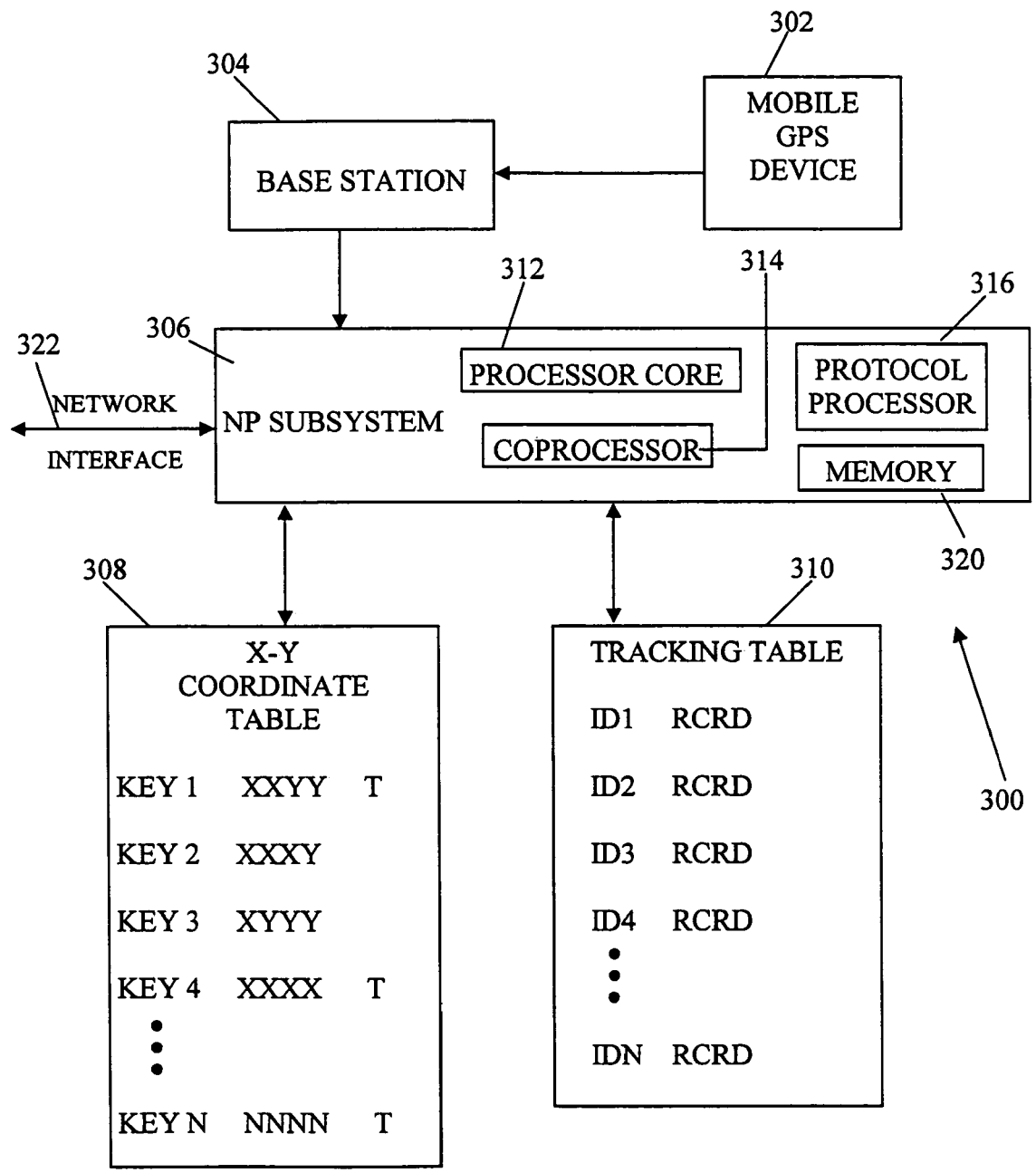
FIG. 3 is a network processing system according to the present invention.

FIG. 1 illustrates a prior art composite graphical mapping interface 100 of returned GPS information in the form of a graphical X-Y area grid format 108 "overlaid" on a corresponding street map database 120. Individual GPS grid coordinates are mapped to a more user-friendly "x" 104-"y" 106 coordinate system comprising a plurality of discrete X-Y grid areas 102. FIG. 2 is a block diagram illustration of one method 200 according to the present invention for generating the associative overlay "map" of FIG. 1, and FIG. 3 is a block diagram illustration of one network processor (NP) system 300 according to the present invention for practicing the method 200 and generating the mapping 100.

NP's are primarily used today in switching and routing products within computer network systems. A conventional NP combines both hardware assist via coprocessors for packet forwarding and filtering, as well as programmable general purpose and special purpose "protocol processors" for unique network communication functions. For the purpose of this invention, it is preferred that a network processor component 306 include the following components: a programmable general purpose processor core 312, such as the IBM PowerPC™; at least one hardware assist coprocessor 314 to accelerate networking functions associated with packet filtering and forwarding; at least one programmable protocol processor 316 for customization of networking and wireless communication functions; and sufficient embedded memory 320 for on chip packet buffering and operational program storage. What is new in the present invention is the method and application of programmable network processor systems to achieve significant improvement in the mapping of GPS coordinate information to a physical location through adaptation of network processor table access schemes.

It is known to equip mobile devices with GPS technology, and it is anticipated that this practice will become widespread. Cellular phones, for example, will soon be equipped with GPS technology for the purpose of accurately locating the source for emergency 911 calls. What is important under the present invention is that the GPS longitude and latitude coordinates of a plurality of devices, such as all active and tracked cell phones associated with an employer or other entity within a given area, can be received in standard GPS format (degrees-minutes-seconds [dd.mm.ss]), and that this information can be dynamically interfaced with other geographical information and databases to produce useful real-time geographical tracking information.

In step 202, GPS coordinates are received by a basestation 304 from a mobile device 302, such as a cellular phone, in a predetermined packet format. It is preferred that the present invention is configured to operate with common GPS coordinate systems and, accordingly, some embodiments will be configured to receive GPS data in the standard degrees-minutes-seconds format; however, other GPS systems may return their data in different formats, and the present invention is not limited to those embodiments configured to receive degrees-minutes-seconds formats.

It is preferred that the NP 306 is located within the wireless basestation 304 or other centrally located network appliance used for the purpose of tracking the location of mobile devices. However, the invention can also be practiced by a stand-alone co-located or network-connected device that utilizes a third party wireless base station or GPS service. The base station 304 formats the GPS coordinate information for the NP subsystem 306 and passes it to the NP 306.

The NP 306 uses the GPS information to build a "look-up key" in step 206. Conventional NP processor systems typically use table access schemes configured for the rapid processing and routing of network data packets in a computer network. What is new in the present invention is the use of NP table access schemes to achieve significant improvement in the mapping of GPS coordinate information to a physical location. Using the look-up key, the NP subsystem 306 retrieves corresponding X-Y grid coordinates in step 208 from table 308. In some embodiments, the table 308 is stored in a tree structure; in other embodiments, the table 308 is within a Content Addressable Memory (CAM) for rapid access.

In a preferred embodiment, the network processor 306 utilizes a key hashing scheme for rapid access of routing tables. A key hashing scheme reduces the size of the table and, therefore, the amount of memory required. (In other embodiments, a direct look-up table could be used, but the memory space would be large and sparsely populated.) The key hashing scheme could also be applied to the rapid verification of the location of a large number of mobile devices as described in this disclosure.

An advantage of the present invention is that it is not required to translate each GPS coordinate data set into a unique X-Y coordinate, which must then be plotted individually on the mapping interface 100. As the device 302 moves from one GPS coordinate to another, new X-Y locations are quickly determined and their location within one of the discrete grid areas 102. Therefore, the mapping interface 100 need not be updated or refreshed for every GPS coordinate update, but only those updates which indicate that a particular device 302 has moved into another grid area 102. Thus, the present invention provides a means for efficient use of network processing resources to provide graphical mapping information as required by a particular client. It is readily apparent that the size of the grids 102 can be changed as required. Therefore, if a lower mapping resolution is required, or a lesser degree of accuracy for location determination, system resources can be conserved by defining the grid area 102 to encompass a larger geographical area.

Since multiple GPS coordinates may fall within the same X-Y grid 102, a longest prefix type of match, rather than a fixed match, scheme is more applicable. With the longest prefix match (LPM) scheme, the most significant portion of the binary encoded GPS coordinates may be used to determine the X-Y grid 102 location. For example, if the GPS coordinates are reported in dd.mm.ss format, the LPM scheme allows multiple GPS coordinates within the same X-Y grid 102 to share a common prefix, yet differ in the least-significant bit positions of the encoded value.

The movement of a specific device can be tracked by recording the coordinate information as the device moves from one X-Y grid 102 to another in tracking table 310. Each device 302 can be uniquely identified, for example by an IP address for a PDA, or by its phone number for a cell phone. In this way, the location of thousands of devices can be maintained simultaneously and made readily available within a client network, or through the network interface 322 via the Internet.

There are many benefits to using an NP for this application. Some NP architectures, such as the IBM PowerNP™ model NP4GS3, have unique hardware assist tree search support that can support millions of look-ups per second. It is preferred that the look-up table for a given geographic area is a static table that is created in advance in order to improve the efficiency of the GPS to X-Y coordinate mapping. Active mobile devices can transmit their GPS coordinates to a central location in a wide variety of methods; for example, they may periodically broadcast their ID and GPS location, they may do so continuously, or when a specific communication such as a 911 call is initiated, or a combination of the above.

It is readily apparent that one of the advantages of the present invention is its ability to rapidly and precisely locate a mobile device in an emergency situation, such as one placing a 911 call. It may also be used to track the movement of a specific device and in non-emergency usage. The invention may be used to determine the rate of movement of one or more devices; for example, by sampling the movement of multiple devices on a freeway, the application can gain an approximation of traffic conditions.

The invention may also be used to search for the location of a known device (e.g., if IP address or phone number is known). In the present embodiment, a database is maintained in tracking table 310 to track location of mobile devices that are turned on and in contact with the basestation 304.

The invention may also be used in coordination with other databases, either within the system 300 or without. For example, the location of cellphones, PDAs and/or laptop mobile users may be interfaced for distribution of location based advertising. The locations of advertisers can be maintained in another table (not shown), either within the current system 300 or outside of it and accessed through Internet or network connections, so that when mobile users are near the advertiser's business location, relevant ads are sent to the display of the device.

Figure 4:
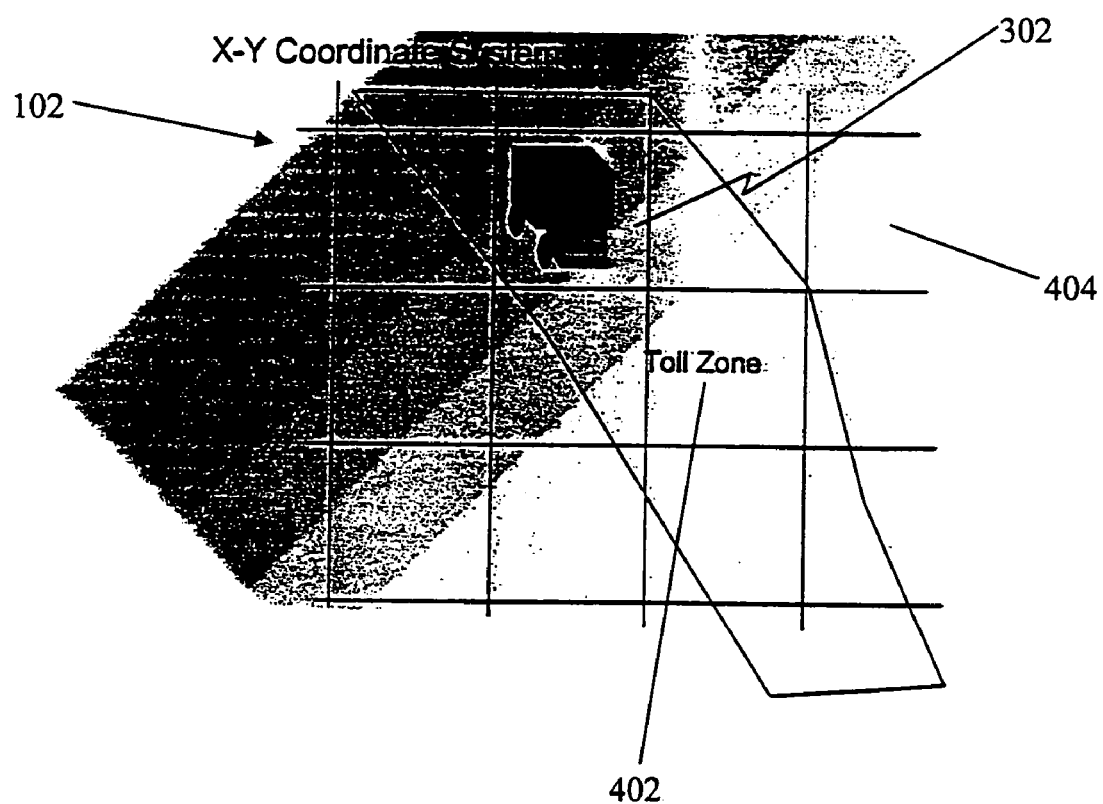
FIG. 4 is a graphical illustration of a mapping display according to the present invention.

FIG. 4 illustrates another application of the present embodiment providing "Automatic Toll Application." The automatic toll application utilizes the GPS and X-Y coordinate system described above to accurately establish the physical location of a mobile unit 302. In a preferred embodiment, as the mobile unit 302 is moving, its current position is continually updated. The GPS coordinates associated with toll roads 130, such as toll bridges and turnpikes, are predetermined and so identified in the X-Y coordinate database table 308. Each toll road 130 overlaps a plurality of X-Y grids 102. Accordingly, the system 300 may be configured to indicate a toll charge whenever a mobile device 302 is identified within one of the X-Y grids 102. Where this may result in errors due to other non-toll roads being located within the same X-Y grid 102, a smaller grid scale may be practiced within the current invention for a finer and more accurate resolution than that presently illustrated.

The NP location system 300 can instantly determine when the device 302 enters (or exits) a toll area based on the X-Y grid 102 coordinate system. An additional field is mapped into the X-Y coordinate table 308 to indicate if the indicated X-Y grid 102 is within a toll zone 402, or not, and ergo within a non-toll zone 404). The NP location system 300 can thus track devices 302 and alert a billing application whenever the device enters a toll area 402. This device 302 could then be tracked until it exits the toll zone 402 to determine the correct billing amount. The present invention thus enables a means for providing centralized billing applications for toll collection. For example, tolls could be collected by the cellular service provider as a value-added service to their customers.

Typical toll roads and bridges require a flat fee per usage or on a per mile basis, and, therefore, tracking the amount of time spent within any particular toll zone 402 would be irrelevant for such an application. Parking lots, on the other hand, normally have charges based upon time duration and, therefore, such an application would require an elapsed time determination for the presence of a device 302 within a toll zone 402. Both billing techniques could be implemented within the present invention, providing automated toll collection based on either actual elapsed time within a toll zone 402, or a determination of a location within a toll zone 402 independent of elapsed time, or a combination wherein both presence within and elapsed time of presence within a toll zone 402 is tracked and the information provided to a automated toll calculation algorithm upon demand.

A system such as this would provide a new business model for mobile cell phone companies if this capability was inte grated into cellular phone systems. The cell phone companies could compute toll charges for customers and collect on a regular basis via monthly bills. Some automobile manufacturers provide wireless and GPS devices as options to enable new customer services, such as OnStar™. The proposed toll application could be included with this type of service as well. Note that this automobile based system is probably the preferred embodiment since toll charges of this nature, especially toll parking, are more applicable to cars than to people.

Note that there are conditions that service providers (or customers) will need to consider that are beyond the scope of this disclosure. For example, a passenger with a cell phone in a car, bus or train that passes through a toll area should not be billed.

Figure 5:
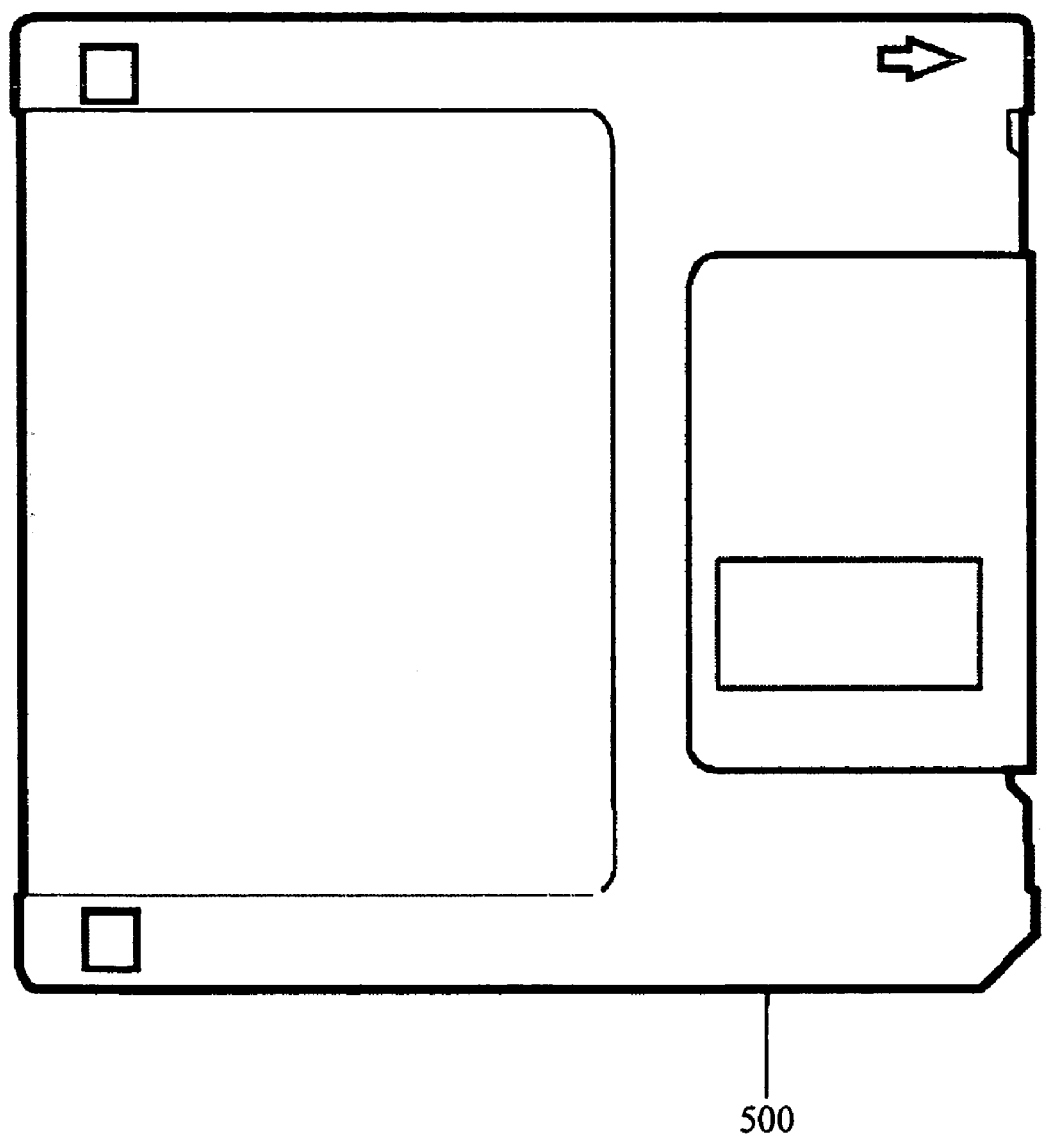
FIG. 5 is plan view of a computer-readable medium or carrier comprising an embodiment of the present invention tangibly embodied in a computer program residing thereon.

FIG. 5 shows an embodiment of the invention described above tangibly embodied in a computer program residing on a computer-readable medium or carrier 500. Other appropriate machine readable storage mediums include fixed hard drives, optical discs, magnetic tapes, semiconductor memories, such as read-only memories (ROMs), programmable (PROMs), etc. The medium 500 containing the computer readable code is utilized by executing the code directly from the storage device, or by copying the code from one storage device to another storage device, or by transmitting the code on a network for remote execution. The medium 500 may comprise one or more of a fixed and/or removable data storage device, such as a floppy disk or a CD-ROM, or it may consist of some other type of data storage or data communications device. The computer program may be loaded into the memory 320 to configure the processor core 312 of FIG. 3 for execution. The computer program comprises instructions which, when read and executed by the NP subsystem 306, cause the system 306 to perform the steps necessary to execute the steps or elements of the present invention.

While preferred embodiments of the invention have been described herein, variations in the design may be made, and such variations may be apparent to those skilled in the art of network processing data systems and methods, as well as to those skilled in other arts. The basestation and processing components identified above are by no means the only components suitable for the manufacture of the systems according to the present invention, and substitute materials will be readily apparent to one skilled in the art. The scope of the invention, therefore, is only to be limited by the following claims.

What is claimed is:

1. A method for tracking mobile devices combining network processor packet processing technology with Global Positioning System (GPS) technology, comprising the steps of:

providing at least one mobile device transmitting GPS location packet format data and identification data;

a network processor building a look-up key with the transmitted GPS data and retrieving X-Y coordinate data from an X-Y coordinate table with the look-up key through a network processor table access scheme executed on at least one network processor hardware assist coprocessor, at least one network processor protocol processor and a network processor embedded memory;

the network processor comparing the retrieved X-Y coordinate data to a first map structure comprising a plurality of location zones, correlating a first map location zone corresponding to the retrieved X-Y coordinate data with the transmitted identification data and writing the correlated first map location zone and identification data into a tracking table entry in a tracking table; and the network processor comparing the first map location zone and identification data with a plurality of billing zones within a billing table and producing a billing charge responsive to a correlation of the first map location zone with at least one of the billing zones.

2. The method of claim 1 wherein the table access scheme is a key hashing scheme.

3. The method of claim 2 wherein the table access scheme is a longest prefix type of match scheme.

4. The method of claim 1 wherein the first map structure is a static lookup table.

5. The method of claim 1, further comprising the steps of:

the network processor identifying a second map location zone corresponding to second GPS location packet format data;

the network processor correlating the second map location zone with the identification data; and the network processor writing the second map location zone correlated to the identification data into a tracking table entry in the tracking table.

6. The method of claim 1, wherein the plurality of location zones each define a common geographic area, further comprising the step of resizing the location zone common geographic area.

* * * * *